Feb. 20, 1923.
L. A. DARLING
POWER GENERATOR
Original Filed June 24, 1916   4 sheets-sheet 4
FIG. IV.
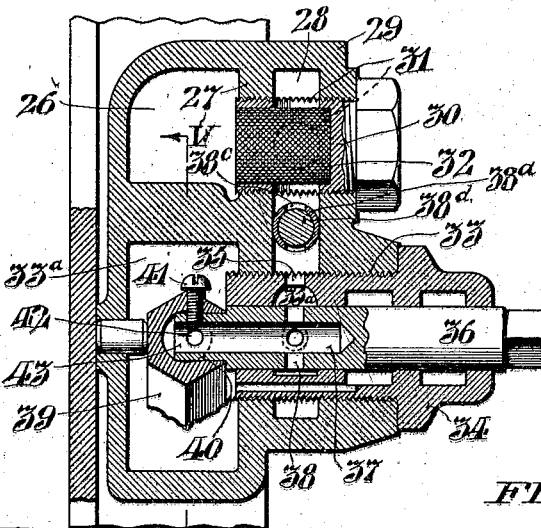
FIG. VII.
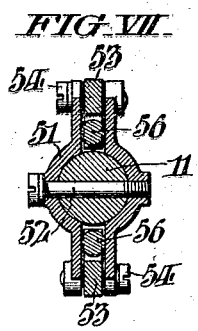
FIG. VI.
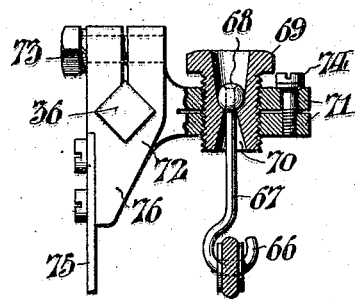
FIG. V.
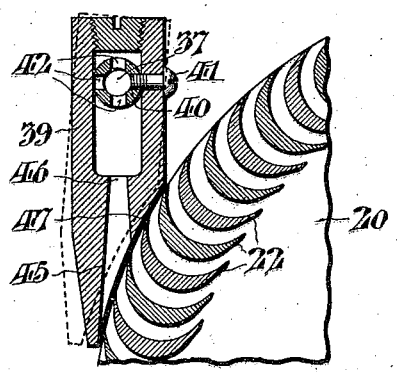
Inventor
Lewis A. Darling, Patented Feb. 20, 1923.

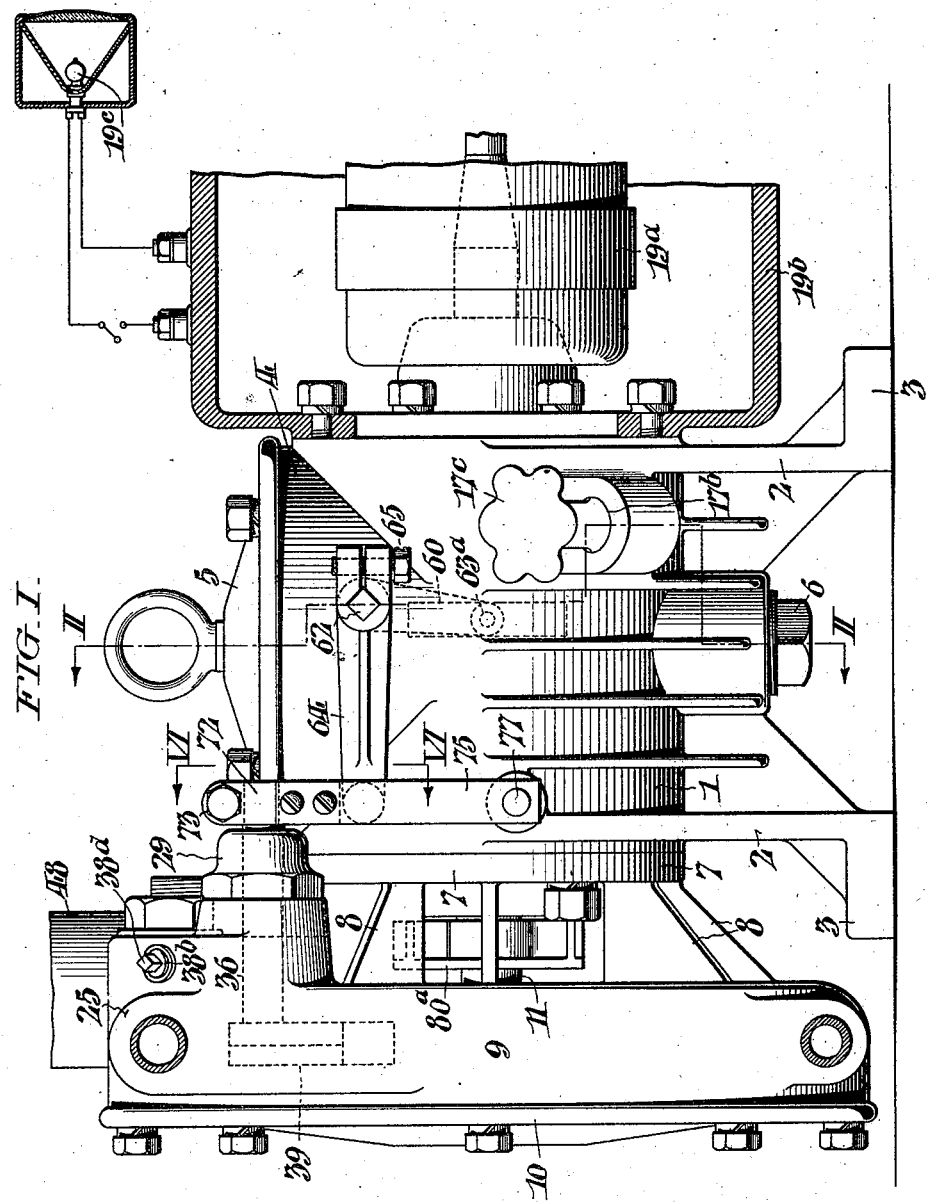

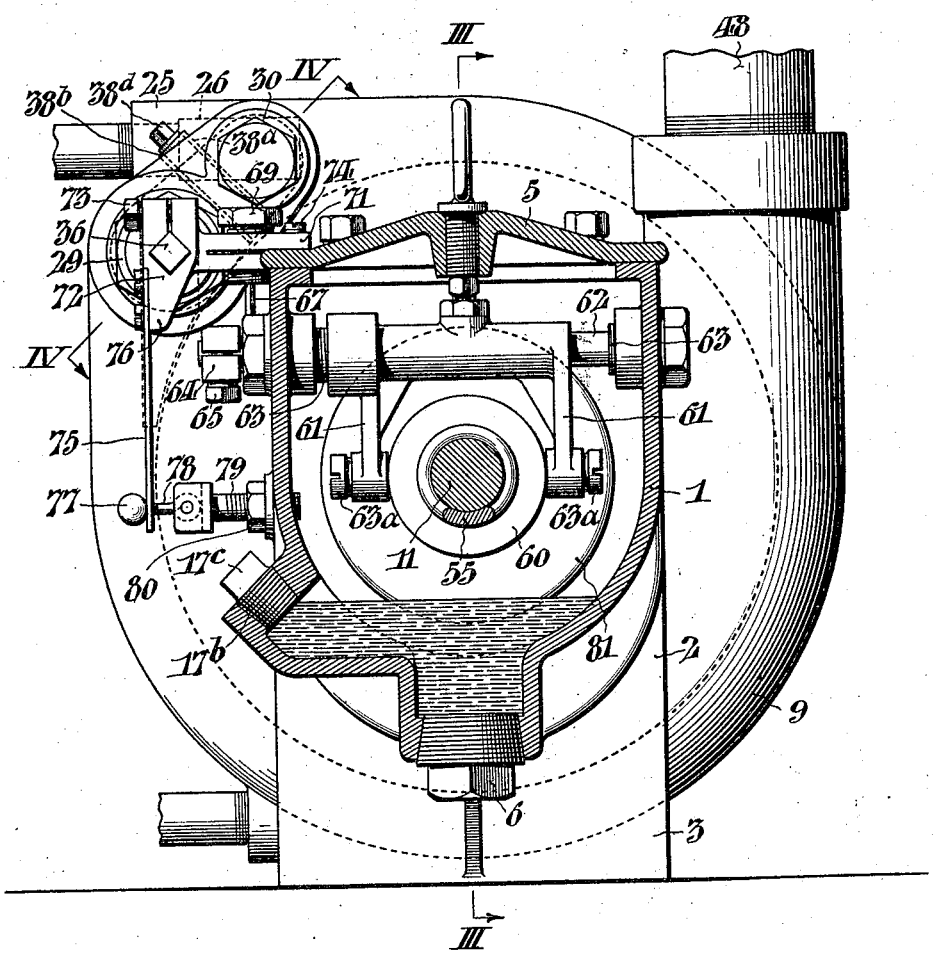

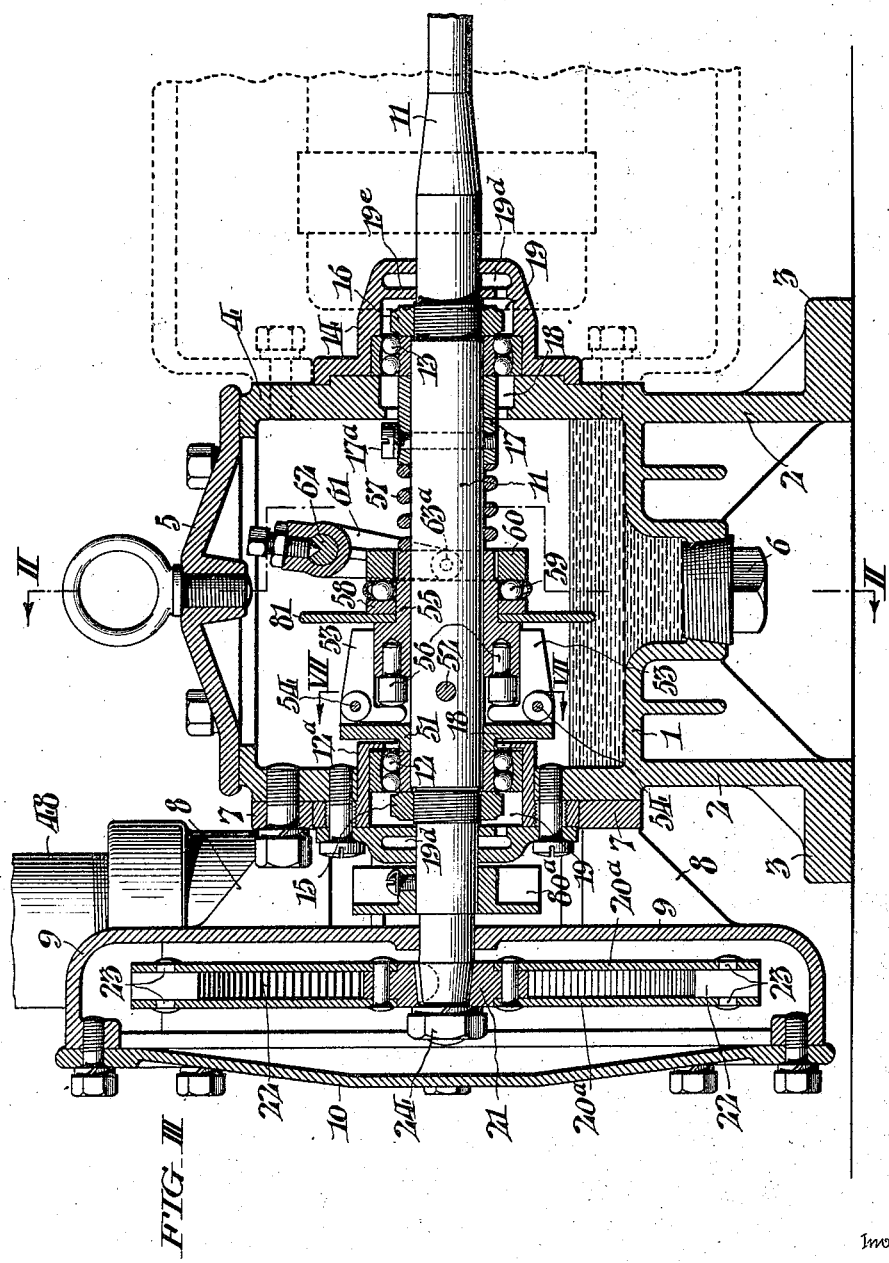

1,446,084

UNITED STATES PATENT OFFICE.

LEWIS A. DARLING, OF PHILADELPHIA, PENNSYLVANIA, ASSIGNOR TO ELECTRIC SERVICE SUPPLIES COMPANY, OF PHILADELPHIA, PENNSYLVANIA, A CORPORATION OF PENNSYLVANIA.

POWER GENERATOR.

Original application filed June 24, 1916, Serial No. 105,661. Divided and this application filed December 15, 1917. Serial No. 207,242.

*To all whom it may concern:*

Be it known that I, LEWIS A. DARLING, a citizen of the United States, residing in Philadelphia, in the county of Philadelphia and State of Pennsylvania, have invented certain new and useful Improvements in Power Generators, whereof the following is a specification, reference being had to the accompanying drawings.

This application is a division of my pending application Serial No. 105661, filed June 24, 1916.

My invention relates to power generators, particularly those of the turbine type, and to auxiliary devices which are peculiarly adapted to use in connection therewith, but which are not necessarily restricted to such use. Amongst the objects is the provision of a generator system comprising, among other features, fluid feeding means, speed governing means, and oiling means, the whole system being divided into compartments operatively connected. A generator system of this type is particularly adapted for use in cases where sustained uniformity of speed and voltage and means for insuring the same are of great importance, as in the case of electric headlights for locomotives, and the present embodiment of my invention relates to that type.

This invention will be best understood by reference to the drawings of the illustrative embodiment thereof in connection with a description of the same, and in the drawings—

Fig. I, is a side elevation of the apparatus, indicating in partly broken section portions of an electric generator operatively connected with the system.

Fig. II, is a vertical cross section on the line II—II, of Fig. I.

Fig. III, is a vertical longitudinal section on the line III—III of Fig. II.

Fig. IV, is a sectional detail on an enlarged scale on the line IV—IV of Fig. II.

Fig. V, is a diagrammatical sectional detail on the line V—V, of Fig. IV.

Fig. VI, is an enlarged sectional detail on the line VI—VI, of Fig. I.

Fig. VII, is a sectional detail on the line VII—VII, of Fig. III.

The present embodiment of my invention comprises, Fig. I, a substantially cylindrical barrel or casing 1, having a depending supporting web 2, at each end, provided with a supporting flange or foot 3.

As shown at one end in Fig. I, the casing 1, carries a suitable electric generator $19^a$ in a housing or frame $19^b$ connected with the headlight $19^c$ suitably supported.

The armature, fields and brushes of such an electric generator as is indicated, may be of any preferred construction to supply current for the use to which it is to be put, as for lighting incandescent headlights and supplying any other incandescent light for and about a steam locomotive, or elsewhere.

The casing or housing 1, Fig. I, has an opening in its top within a curvilinear, upwardly extended flange 4, with a cover 5, therefor, affording ready means of access to the interior; it has also an oil drain plug 6, at the bottom.

The reservoir afforded by the lower portion of the casing 1 is supplied with oil through the opening $17^b$, in the casing (Fig. II) which has a plug $17^c$. This opening is preferably so located that when replenishing the oil supply therethrough, it will prevent the oil level rising above the point at which it has been found the best results are obtained. Also, oil-flooding of the machine is prevented as the highest level of oil is thus automatically controlled.

One advantage of constructing the casing 1, in the form of a hollow member, or barrel, is that it not only affords a strong, compact construction for the operating parts, to be described, but also offers a convenient structure for embodying therein my improved oiling means, the oiling feature being an important one, particularly in the construction of all high speed generators.

Extending through the casing 1, Fig. III, is a main power shaft 11, having widely separated bearings 12, 13, at the opposite ends or sides of the casing. The bearing 12, is supported in a sleeve member $12^a$ in the front end wall of the casing 1; and the bearing 13, is supported in a cap member 14, secured, Fig. III, to the right-hand or forward end of the casing 1. The casing 1, Fig. III, is here used as an oil reservoir, and the oil obviously has ready access to the bearing 12, and to the bearing 13, by means of openings 18, through the walls of the casing 1, and the sleeve 12ª respectively. The bearing members 12ª and 14 thus connected to the casing 1 have bores for the shaft 11 at their outer sides.

These bearings are retained against longitudinal movement outwardly on the shaft 11 by locking nuts 15, 16, respectively, threaded on the shaft. The bearing 13, may be retained against longitudinal movement in the opposite direction by any convenient means such as a sleeve 17, locked to the shaft, as by a screw 17ª, or the shaft 11, may be enlarged at this point in lieu of the sleeve, if desired.

While stuffing boxes may be used if desired for the bearings of the shaft 11, I have found that oil chambers effectively take care of all leakage of this kind, and provide necessary protection for the bearings 12, 13, against the entrance of dirt, etc. Accordingly, I have provided chambers 19, one at each end of the casing 1, for this purpose. Oil that leaks through the bearings 12, 13, and is thrown off by the nuts 15, 16, or the shaft 11, adjacent thereto, is caught and retained by these chambers at the bottom thereof. These rotating nut members 15, 16, it will be seen, directly overlap the annular outward passage from between the ball ring members of the bearings 12, 13.

It will be obvious that oil collected in these chambers 19, will, if it reaches the height of the channel 18, overflow into the reservoir or casing 1, and will never rise any higher (in the chamber 19) than the openings to said channels.

Adjacent the chamber 19, at each end of the casing 1, is a second chamber 19ᵈ, which serves to collect any oil that may work past the web 19ᵉ, said chamber communicating at its bottom with the chamber 19. The right-hand chamber 19ᵈ is in the cap 14, while the left-hand chamber 19ᵈ is in a cap portion of the member 12ª secured to that end of the casing 1, as shown.

The housing 9, Fig. III, for the turbine wheel is carried by webs 8, from the end plate 7, and the rear wall of this housing is apertured to receive the end of the shaft 11. At the point where the shaft 11, passes into the wheel housing 9, a slight clearance for the shaft is provided and the webs 8, extending between the wheel housing and the end plate 7, and the central casing 1, to which the wheel housing is attached as by screws, are so designed as to form a recess for the reception of a fan or baffle plate 80ª, which is secured to and turns with the shaft 11. Said fan serves to prevent any exhaust fluid, as steam, which may escape through the clearance space, from within the turbine casing, from entering the central casing 1, and interfering with and lowering the efficiency of my novel oiling system, hereafter described. The fan also tends to reduce by reason of air circulated, the quantity of heat transmitted from the housing 9, to the casing 1.

Further, the fan blades offer a convenient means of holding the shaft when disassembling the generator or certain parts thereof. The housing 9, is equipped with a removable cover 10, secured thereto by screws and ready access to the interior of the housing is thus afforded.

From one side of housing 9, an exhaust pipe 48, leads to atmosphere or condenser. The exhaust passage is preferably formed integral with the housing 9.

At a convenient point in the lower portion of housing 9, a suitable opening is provided for draining purposes.

The housing 9, is provided with a neck 25, on its edge and near the top, having a passage 26 therethrough, and by means of which the propelling medium may be supplied to the turbine wheel chamber and wheel 20, hereafter described. Within this neck, the passage 26, extends laterally to the right across the housing to the rear thereof through a wall 27, communicating with a vertical passage 28, in a boss 29, extended laterally from the case 1. The passage 26, contains a strainer 30, which may be a tubular member, threaded to engage the wall 27, and boss 29, and provided on its outer end with a head for convenient insertion and removal thereof as by a wrench.

This strainer 30, may be provided with a plurality of apertures 31, in the side thereof to permit free passage of steam in all directions, and it may carry a sheet of any suitable straining material, as fine wire cloth 32, on its inner face. Elastic fluid under pressure is directed to enter the center of the cylindrically shaped wire cloth or strainer 32. Thus this strainer material will not collapse even when entirely clogged with foreign matter which is effectually prevented from entering the steam passage ways and interfering with the speed control of the generator.

The passage 28, leads downwardly from the strainer mesh 32, into a longitudinal nozzle shaft passage 33, extended across the boss 29, to the interior of the housing 9, and the turbine chamber 33ª. In this passage 33, for convenience, I insert a bushing 34, threaded to engage the wall 27, and the boss 29, and provided with a series of circumferentially arranged openings or steam inlets 35. These inlets communicate with a counterbored section of the bushing 34, to form, in effect, a circular steam chamber 35ª.

For feeding the propelling medium to the nozzle any desired and suitable means may be provided.

I employ a novel construction comprising a hollow nozzle carrying and feeding shaft 36, provided with a longitudinal nozzle feeding passage 37, and passages 38, leading from the same to the chamber 35ª. The shaft has a nozzle 39, secured to its left-hand end, and is a part of my speed control and governing means.

While it may be preferable to proportion the size of the steam passage 37, in the nozzle shaft 36, and if necessary, the steam passages 35, 35ª, leading thereto, to the approximate steam pressure regularly carried in a particular installation, so that the full load, at proper voltage to the headlight, will be sustained at such pressure, this is not necessary.

In order that the generator may be used conveniently also in cases where the conditions are for some reason likely to be changed, and where it may be desired to carry the full load at less than the full available steam pressure, passages for steam may be proportioned to the full load to perform the full service at some minimum pressure, say 150 pounds.

A suitable passage such, for instance, as the passage 38ª, see Fig. II, dotted lines, may be provided leading from the outside of the boss 29, to the passage 28, and into this passage a sleeve 38ᵇ, may be inserted and provided with ports 38ᶜ.

A steam cock 38ᵈ, of suitable length, Fig. II, may then be threaded into the sleeve 38ᵇ, so that by turning the cock in or out, the ports 38ᶜ, may be closed or opened to the desired extent. Then if steam is normally carried at say 150 pounds pressure, and it is desired to increase this pressure to 250 pounds, it will be possible to carry the full load at the original pressure of 150 pounds under the changed conditions, by closing the ports 38ᶜ, sufficiently to permit only 150 pounds pressure to be supplied to the nozzle shaft 36. I employ a rigid fluid feeding member, as a nozzle 39 (Figs. IV, V) secured to the reduced end 40, of the shaft 36, as by a screw 41, and from which shaft the propelling medium is fed to the nozzle, through lateral apertures 42, and a longitudinal aperture 43. The nozzle depends (Fig. V) in close proximity to the turbine wheel 20.

A longitudinal passage 45, through the nozzle is contracted at its inner end to form a throat 46, which gradually increases in diameter toward the outer end of the nozzle to provide more space for the propelling medium as its pressure is decreased. The nozzle 39, is bevelled on its side 47, adjacent to the turbine wheel, to permit close positioning of it relative to the blades 22. The turbine wheel may be of any desired form of construction, and herein comprises two parallel solid side members or disks 20ª, conveniently secured to a hub 21, as by rivets.

These disks are provided, Figs. III, V, near their edges with a series of curved vanes, blades or buckets 22, extended from one disk to the other, the pockets between them opening into the central space between the two disks. The blades may be secured to the disks in any suitable manner. In this instance I have, Fig. III, extended posts 23, on the ends of the blades through the disks and headed them over. The turbine is retained on the shaft 11, which may be tapered to receive the wheel hub 21, by a nut 24.

An important feature in the construction of any machine for use under conditions where regularity of speed and voltage is of prime importance, is the governing means for insuring such regularity. Particularly is this so in the case of a machine adapted for use in connection with a headlight on a locomotive, where fluctuation in the voltage is a serious defect because, as stated, the life of the lamp is materially shortened thereby and, besides increasing the expense of maintenance, its reliability is impaired.

To insure the required sustained evenness of speed and voltage, I have, in this case, conceived a construction which embraces the principle of the fly ball governor applying it to control of the turbine actuating medium, the vital mechanism being a part of my oiling system, hereafter described.

In my construction this governor, and a portion of its linkage, hereafter described, is enclosed within the central frame of the generator, which arrangement permits my very efficient and dependable oiling system to be used.

Referring again to Fig. III, I provide the shaft 11, with a collar 51, which may be secured thereon as by a pin 52. The collar 51, is recessed at a plurality of points on its face to receive governor weights herein shown also as nozzle-positioning bellcrank levers 53, pivotally secured therein, as by pins 54, the longitudinal arm of the weights or levers preferably being the longest.

Adjacent to the collar 51, is a movable governing sleeve 55, of suitable thickness, and drilled at one end to receive a plurality of lever-engaging pins 56, with enlarged heads. These pins are positioned opposite and are adapted to be engaged by the short arms of levers 53.

On the shaft 11, and between one end of this sleeve 55, and adjacent sleeve 17, is a weight, opposing coiled spring 57, seated against opposed ends of said sleeves. This spring acts normally to press the sleeve 55, toward the rear of the machine, as shown in Fig. III, and tends, with the nozzle-positioning and governing means, to be presently described, to allow the nozzle 39, to take a position to deliver steam directly adjacent the blades 22, of the turbine wheel 20, as in Fig. V, full line position.

The sleeve 55, is reduced at one end, and carries thereon one ring 58, of a ball bearing, and ball race 59, thereof, constituting, together with a co-operating pivotally supported ring 60, a nozzle-positioning and governing yoke-engaging member.

This ring 60 (Figs. II, III) is supported by a nozzle-positioning and governing yoke 61, carried in turn by a yoke shaft 62, pivotally mounted in bushings 63, 63, threaded into the opposite side walls of the casing 1. The ring 60, is pivotally supported between the arms of the yoke 61 (Fig. II) by screw pins 63ª. For effecting the control of the nozzle 39, by means of the governor weights 53, spring 57, and yoke 61, I can use the construction which I will now describe.

The shaft 62, carries upon one end (which, in Fig. II, is at the left) a crank 64, one end of which is split and secured to the squared end of the shaft 62, by means of a locking screw 65. The opposite end of the crank 64, is apertured and is engaged by a hook, 66, on the lower end of a link 67, carrying at its upper end a curvilinear head 68.

The head 68, is preferably received by an adjustable socket-like member 69, herein shown as a bushing, the passage 70, therethrough being flared at one end, to permit ready insertion and removal of the head 62, and at its opposite end freedom of movement of the link 67.

This bushing 69, is threaded into and therefore adjustably secured to one arm 71, of a three-arm lever 72, secured to the squared end of the nozzle shaft 36. The lever 72, may be secured to the shaft 36, in any desired and suitable manner, as, for instance, by splitting the end of the lever arm and locking it on the shaft 36, by a screw 73; and the bushing 69, may be satisfactorily locked in adjusted position in the end of lever 72, by a similar screw 74.

While any suitable medium, as air or liquid, may be used as a propelling agent, for use on a steam locomotive, as for a headlight, steam offers many advantages, and the embodiment of my invention described herein is adapted to be operated by steam from the locomotive.

It will be obvious that when the actuating fluid for the turbine is supplied through the pipe in neck 25, it will flow through passage 26, strainer 30, to passage 28, thence to openings 35, about the nozzle shaft 36, through apertures 38, to nozzle passage 37, in shaft 36. From the passage 37, it is delivered by means of side openings 42, and end opening 43, to the passage 45, in the nozzle 39, as stated.

The position of the shaft 36, controls the position of the nozzle relative to the turbine wheel, as rotation of the shaft 36, will move the nozzle 39, toward or away from the blades 22, and therefore vary the quantity of propelling medium delivered thereto. As the speed of the generator increases, the lever arms 53, tend to fly outward, but are restrained by the pins 56, collar 55, and they in turn are restrained by the spring 57.

This spring is preferably of such tension that it will not yield until the speed of the main shaft is approximately, but not quite up to, that at which it is desired that the shaft be run in order to run the electric generator at the desired speed. When the spring yields, it permits the collar 55, and ball bearing members 58, 59, to slide longitudinally on the shaft 11, and thus swing the ring 60, in the same direction. This swinging of the ring 60, also acts through its connection with the yoke arms 61, 61, to turn yoke shaft 62, acting in turn through the crank 64, its connections with the fluid feeding member, herein its link 67, and lever 72, to turn the nozzle shaft 36, and nozzle 39, with relation to the turbine wheel 20. This action determines the quantity of propelling medium that will be impelled against the blades 22, of the wheel 20, and thereby determine the speed of the shaft 11, and in this case, generator 19ª, and voltage of the lamp 19ᶜ.

Obviously, when the rotatable shaft 36, is turned to throw the nozzle 39, close to the blades, (see Fig. V, full line position) they will receive substantially the full driving effect of the fluid. When the shaft is turned to throw the nozzle more or less away from the blades, (dotted line position Fig. V), they will receive less driving effect than before, and rotate more slowly.

While the foregoing construction will provide very complete and accurate control and adjustment of the nozzle relative to the turbine wheel 20, and hence the speed of the generator, I have provided an additional adjusting member 75, for still more accurately adjusting and controlling the speed of the generator, and also for returning the nozzle to its initial position.

This additional or supplementary speed controlling means for obtaining still finer adjustment and more complete control comprises a second spring member 75, herein a leaf spring (Figs. II, VI), one end of which is secured to the arm 76, of the lever 72. Its opposite and lower end is adjustably engaged by the head 77, of the link 78, pivotally secured to the adjustable screw 79, threaded into the casing 1, and locked in position by the nut 80. It is, of course, obvious that by means of this spring 75, and its adjustable connections, an additional pressure may be imposed upon the lower arm 76, of the lever 72, and shaft 36, and acting to restrain the lever and shaft 36, against rotation by the arm 64, also to a most accurately gauged degree. Therefore, the spring 57, is adjusted to give approximately the compression necessary to yield at a speed somewhat below that required of shaft 11, and through connections already described, actuate the shaft 36. The spring 75, is also adjusted to a still finer degree and will, by its tension, still more accurately determine the time and extent of actuation of shaft 36, and thereby provide a most complete control of the shaft and nozzle 39, carried thereby with a corresponding resulting uniformity of speed. This additional adjusting spring 75, also co-acts with the governor spring 57, to take up all lost motion in the speed controlling mechanism and thus acts to assist in maintaining the proper speed and provide proper voltage for the lamp.

For properly oiling the several parts, I have conceived a novel construction. It is, of course, very desirable that the oiling system be one that will require a minimum of attention and possess a maximum of efficiency. As already stated, I use the casing 1, as an oil reservoir and am thereby enabled to carry a liberal supply.

For feeding the oil in the required small quantity to the several parts without causing it to foam, I have provided an oil feeding disk 81, which is carried by the sleeve 55, on the shaft 11. This disk extends below the normal maximum level of the oil in the reservoir and when running does not violently splash the oil, but in a continuous action takes up and causes lubricant to be fed and distributed to the mechanism within, and properly communicating with, the central casing, including the bearings 12, 13 as well as the governor itself. This is accomplished without a violent splashing of the oil, which results in so extensive a leakage of the same about the bearings, and which splashing is so often the result of other forms of construction. The foregoing has proven to be a very efficient, economical and automatic oil system, and I have found that a single filling of oil in a plant in accordance with my invention may be operated for a long period without attention as to oiling, such plants having been repeatedly operated for several months to suply incandescent lights on locomotives, without any attention whatever to lubrication, after a full supply of oil had been introduced in proper manner.

In past attempts to use generators for electric headlights for locomotives, a serious obstacle has been the inability to insure a steady and unvarying speed, so that when driving an electric generator which furnishes current for lighting, for instance, the voltage will remain substantially constant, and a variable voltage seriously shortens the life of the lamp.

A generator for use in connection with a locomotive headlight, moreover, must be of compact and strong design, comprising a minimum of easily assembled parts which are economical to manufacture.

I am able by the foregoing construction to obtain a uniformity of speed, and in the present case, a uniformity in voltage, resulting in uniformity of lighting capacity and longevity of the lamp hitherto unattainable.

This construction is remarkably simple in operation, requiring but little attention, especially as to oiling, and is compact and strong to withstand the hard usage to which it is necessarily subjected.

It will be clear that many details of construction may be varied without departing from the spirit of my invention and scope of the accompanying claims, or sacrificing its advantages.

Having thus described my invention, I claim:

1. A power generator comprising an oil reservoir, a shaft with a governor thereon, a bearing for the shaft, and oiling means for the bearing including a disk adapted to run in oil and feed it to bearing and governor.

2. In a power generator, a casing, a bearing member at one end of said casing, a shaft through the bearing, a governor on the shaft within the casing, and means operated by rotation of the shaft for automatically lubricating said bearing and governor.

3. In a turbine, a housing adapted to contain an oil bath, a bearing member connected thereto open for lubrication on the side toward the housing and having a shaft bore on the opposite side, a bearing in said bearing member in open communication with the housing, a shaft in said housing, a governor on the shaft, and means on the shaft within the housing for lubricating the bearing and governor.

4. In a power generator, a shaft, a bearing for the shaft, governor weights carried by the shaft, an oil reservoir, and common automatic means for oiling both bearing and governor weights therefrom.

5. In a turbine, a casing, a shaft therein, a bearing for the shaft, a governor on the shaft, with a supply opening in the casing at a position to prevent filling of the casing with oil above the proper level.

6. The combination of a rotary shaft and a bearing therefor, means affording an oil reservoir beneath the shaft, a governor on the shaft, and means carried by the shaft for taking up oil from the reservoir to lubricate the governor.

7. The combination of a rotary shaft with a governor thereon, means affording an oil reservoir beneath the shaft, means carried by the shaft for taking up oil from the reservoir to lubricate the governor, and a bearing for the shaft open toward the governor, and receiving oil from said means.

8. The combination of a rotary shaft, means affording an oil reservoir beneath the shaft, governor weights carried by the shaft, and means carried by the shaft for taking up oil from the reservoir to lubricate the governor weights.

In testimony whereof, I have hereunto signed my name at Philadelphia, Pennsylvania, this fourteenth day of December, 1917.

LEWIS A. DARLING.

Witnesses:
JAMES H. BELL,
E. L. FULLERTON.